US011315218B2

(12) United States Patent
Matsumoto et al.

(10) Patent No.: US 11,315,218 B2
(45) Date of Patent: Apr. 26, 2022

(54) COMPOSITION PROCESSING SYSTEM, COMPOSITION PROCESSING APPARATUS, AND COMPOSITION PROCESSING METHOD

(71) Applicant: FUJIFILM Corporation, Tokyo (JP)

(72) Inventors: Kazuma Matsumoto, Tokyo (JP); Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/182,323

(22) Filed: Feb. 23, 2021

(65) Prior Publication Data

US 2021/0183012 A1 Jun. 17, 2021

Related U.S. Application Data

(63) Continuation of application No. PCT/JP2019/035055, filed on Sep. 5, 2019.

(30) Foreign Application Priority Data

Sep. 12, 2018 (JP) .............................. JP2018-170761

(51) Int. Cl.
G06T 3/40 (2006.01)
G06T 7/00 (2017.01)
(Continued)

(52) U.S. Cl.
CPC .......... G06T 3/4038 (2013.01); G06T 7/0002 (2013.01); H04N 5/23238 (2013.01);
(Continued)

(58) Field of Classification Search
None
See application file for complete search history.

(56) References Cited

U.S. PATENT DOCUMENTS

2011/0216210 A1   9/2011  Hao
2013/0216089 A1*  8/2013  Chen ..................... G06T 7/0002
                                                              382/100
(Continued)

FOREIGN PATENT DOCUMENTS

CN    102783135 A    11/2012
CN    106791390 A     5/2017
(Continued)

OTHER PUBLICATIONS

The extended European search report issued by the European Patent Office dated Oct. 8, 2021, which corresponds to European Patent Application No. 19860943.0-1209 and is related to U.S. Appl. No. 17/182,323.
(Continued)

Primary Examiner — Edemio Navas, Jr.
(74) Attorney, Agent, or Firm — Studebaker & Brackett PC

(57) ABSTRACT

There are provided a composition processing system, a composition processing apparatus, and a composition processing method that allow efficient inspection. A composition processing system includes an image capturing apparatus A, a first computer B, and a second computer C. The first computer B includes: a first image acquisition unit; a composition supplementary information acquisition unit that acquires composition supplementary information for composing a first large-area image; a minified separate image generation unit that generates minified separate images acquired by reducing image sizes of the separate images; a second large-area image generation unit that composites the minified separate images on the basis of the composition supplementary information to generate a second large-area image; and an image display unit that displays the second large-area image. The second computer C includes: a second image acquisition unit that acquires from the first computer (Continued)

the plurality of separate images to which the composition supplementary information is added; and a first large-area image generation unit that composites the plurality of separate images on the basis of the composition supplementary information to generate the first large-area image.

14 Claims, 12 Drawing Sheets

(51) Int. Cl.
    *H04N 5/232*     (2006.01)
    *H04N 5/262*     (2006.01)

(52) U.S. Cl.
    CPC ......... *H04N 5/2624* (2013.01); *H04N 5/2628* (2013.01); *G06T 2207/20212* (2013.01); *G06T 2207/30168* (2013.01); *G06T 2207/30184* (2013.01)

(56) References Cited

U.S. PATENT DOCUMENTS

| | | | |
|---|---|---|---|
| 2016/0381296 A1 | 12/2016 | Yasunaga | |
| 2017/0244895 A1* | 8/2017 | Zilberman | ......... H04N 5/23229 |
| 2018/0302548 A1 | 10/2018 | Bao et al. | |

FOREIGN PATENT DOCUMENTS

| | | | |
|---|---|---|---|
| CN | 108432222 A | | 8/2018 |
| JP | H09-139879 A | | 5/1997 |
| JP | 2000-358194 A | | 12/2000 |
| JP | 2011-002892 A | | 1/2011 |
| JP | 2011002892 A | * | 1/2011 |
| JP | 2016-005263 A | | 1/2016 |
| JP | 2017-011687 A | | 1/2017 |
| JP | 2017-167969 A | | 9/2017 |
| JP | 2018-090982 A | | 6/2018 |

OTHER PUBLICATIONS

International Search Report issued in PCT/JP2019/035055; dated Nov. 19, 2019.
International Preliminary Report on Patentability and Written Opinion issued in PCT/JP2019/035055; dated Mar. 9, 2021.
An Office Action mailed by China National Intellectual Property Administration dated Jan. 11, 2022, which corresponds to Chinese Patent Application No. 201980059541.2 and is related to U.S. Appl. No. 17/182,323 with English language translation.

* cited by examiner

COMPOSITION PROCESSING SYSTEM, COMPOSITION PROCESSING APPARATUS, AND COMPOSITION PROCESSING METHOD

CROSS-REFERENCE TO RELATED APPLICATIONS

The present application is a Continuation of PCT International Application No. PCT/JP2019/035055 filed on Sep. 5, 2019 claiming priority under 35 U.S.C § 119(a) to Japanese Patent Application No. 2018-170761 filed on Sep. 12, 2018. Each of the above applications is hereby expressly incorporated by reference, in its entirety, into the present application.

BACKGROUND OF THE INVENTION

1. Field of the Invention

The present invention relates to a composition processing system, a composition processing apparatus, and a composition processing method and specifically relates to a composition processing system, a composition processing apparatus, and a composition processing method for acquiring separate images and compositing the separate images to generate a large-area image.

2. Description of the Related Art

A technique for acquiring a plurality of separate images and compositing the acquired separate images to acquire a large-area image (panoramic image) has been proposed.

For example, a technique described in JP2000-358194A aims to perform image composition with high accuracy regardless of the capacity of a memory included in a processing apparatus even in a case where an image acquired as a result of composition is a very large image. Specifically, in the technique described in JP2000-358194A, minified images of a plurality of pieces of image data that are targets of image composition are created, overlapping regions of the minified images are extracted, and the minified images are tentatively aligned on the basis of the extracted overlapping regions to thereby calculate information about the overlapping regions and the adjoining regions, and the pieces of image data are composited on the basis of the calculated information to create one image.

SUMMARY OF THE INVENTION

Currently, structures, such as bridges, roads, and buildings, are inspected by using captured images. For example, a plurality of separate images of a bridge that is an inspection target are subjected to composition processing to acquire one large-area image, and damage, such as cracks, is detected from the large-area image, thereby inspecting the bridge.

Composition processing for separate images requires a computer having a high computational capacity. Therefore, an inspector (user) captures separate images of an inspection target at an image-capturing site, and after completion of capturing of separate images, moves to an environment in which connection to the Internet is possible to transmit the separate images to a server (a computer having a high computational capacity) and cause the server to perform composition processing for the separate images. In such a case, if a region omitted from image capturing is present in a large-area image acquired as a result of the composition processing for the separate images, the inspector may notice the region omitted from image capturing after they have moved away from the image-capturing site. If a region omitted from image capturing is present, the inspector needs to return to the image-capturing site to re-perform image capturing, which may hinder the inspector from efficiently performing the inspection operation.

It is possible to perform tentative composition processing using minified images generated from separate images to check the presence or absence of a region omitted from image capturing at an image-capturing site as in the technique described in JP2000-358194A. In this case, the tentative composition processing is performed at the image-capturing site, and thereafter, a server is caused to newly perform composition processing for the separate images. In this case, information that is used in composition is calculated when the tentative composition processing is performed at the image-capturing site, and information that is used in composition is newly calculated also in the composition processing by the server, which is inefficient because the result of the tentative composition processing at the image-capturing site is wasteful.

JP2000-358194A described above does not mention tentative composition processing at an image-capturing site or use of the result of tentative composition processing at a later time.

The present invention has been made in view of the above-described circumstances, and an object thereof is to provide a composition processing system, a composition processing apparatus, and a composition processing method with which, in a situation where connection to a network is difficult, an omission in capturing of separate images can be checked, re-capturing of separate images after the inspector has moved away from the image-capturing site can be avoided, and composition supplementary information that is generated when an omission in capturing of separate images is checked can be used in composition processing for a large-area image that is performed at a later time, thereby allowing efficient inspection.

To attain the above-described object, a composition processing system that is an aspect of the present invention is a composition processing system including an image capturing apparatus, a first computer, and a second computer, the first computer including: a first image acquisition unit that acquires a plurality of separate images acquired by the image capturing apparatus performing image capturing of a structure that is an inspection target in sections; a composition supplementary information acquisition unit that acquires on the basis of the plurality of separate images, composition supplementary information for composing a first large-area image that corresponds to a large inspection area of the structure; a minified separate image generation unit that generates minified separate images acquired by reducing image sizes of the separate images; a second large-area image generation unit that composites the minified separate images on the basis of the composition supplementary information to generate a second large-area image; and an image display unit that displays the second large-area image, the second computer including: a second image acquisition unit that acquires from the first computer the plurality of separate images to which the composition supplementary information is added; and a first large-area image generation unit that composites the plurality of separate images on the basis of the composition supplementary information to generate the first large-area image.

According to this aspect, by the first computer, the minified separate images acquired by reducing the image sizes of the separate images are generated, and the second large-area image, which is a simple large-area image, is generated from the minified separate images. Therefore, the user can check the second large-area image to check an omission in image capturing at the image-capturing site. The second computer uses the composition supplementary information calculated by the first computer and used in generating the second large-area image to composite the separate images, thereby composing the first large-area image, which allows efficient composition of the separate images.

Preferably, the first image acquisition unit additionally acquires a separate image captured by the image capturing apparatus after the second large-area image has been displayed on the image display unit.

Preferably, the first computer has an image quality examination unit that examines image quality of the separate images.

Preferably, the image display unit superimposes on the second large-area image and displays a result of examination by the image quality examination unit.

Preferably, the composition supplementary information acquisition unit acquires a projective transformation matrix for performing panorama composition for the separate images.

Preferably, the second computer outputs the generated first large-area image via a network.

Preferably, the second computer is a cloud server.

Preferably, the first computer and the second computer are capable of communicating with each other over a network, and the first computer transmits to the second computer the plurality of separate images to which the composition supplementary information is added in a case where a condition of connection to the network is good.

Preferably, the second computer includes a damage detection unit that detects damage from the first large-area image.

Preferably, the second computer includes a damage quantifying unit that estimates an extent of the damage detected by the damage detection unit and quantitatively evaluates the extent of the damage.

Preferably, the second computer includes a damage correction accepting unit that accepts a correction to the damage detected by the damage detection unit.

Preferably, the second computer includes a detection result output unit that outputs a result of detection of the damage detected by the damage detection unit.

A composition processing apparatus that is another aspect of the present invention includes: a first image acquisition unit that acquires a plurality of separate images acquired by an image capturing apparatus performing image capturing of a structure that is an inspection target in sections; a composition supplementary information acquisition unit that acquires on the basis of the plurality of separate images, composition supplementary information for composing a first large-area image that corresponds to a large inspection area of the structure; a minified separate image generation unit that generates minified separate images acquired by reducing image sizes of the separate images; a second large-area image generation unit that composites the minified separate images on the basis of the composition supplementary information to generate a second large-area image; an image display unit that displays the second large-area image; and an output unit that outputs the plurality of separate images to which the composition supplementary information is added.

A composition processing method that is yet another aspect of the present invention is a composition processing method to be performed by an image capturing apparatus, a first computer, and a second computer, in which in the first computer, a step of acquiring a plurality of separate images acquired by the image capturing apparatus performing image capturing of a structure that is an inspection target in sections, a step of acquiring on the basis of the plurality of separate images, composition supplementary information for composing a first large-area image that corresponds to a large inspection area of the structure, a step of generating minified separate images acquired by reducing image sizes of the separate images, a step of compositing the minified separate images on the basis of the composition supplementary information to generate a second large-area image, and a step of displaying the second large-area image are performed, and in the second computer, a step of acquiring from the first computer the plurality of separate images to which the composition supplementary information is added, and a step of compositing the plurality of separate images on the basis of the composition supplementary information to generate the first large-area image are performed.

According to the present invention, by the first computer, the minified separate images acquired by reducing the image sizes of the separate images are generated, and the second large-area image, which is a simple large-area image, is generated from the minified separate images. Therefore, the user can check the second large-area image to check and avoid an omission in image capturing at the image-capturing site. The second computer uses the composition supplementary information calculated by the first computer and used in generating the second large-area image to composite the separate images, thereby composing the first large-area image, which allows efficient composition of the separate images.

DESCRIPTION OF THE PREFERRED EMBODIMENTS

Hereinafter, preferred embodiments of a composition processing system, a composition processing apparatus, and a composition processing method according to the present invention will be described with reference to the attached drawings.

Figure 1:
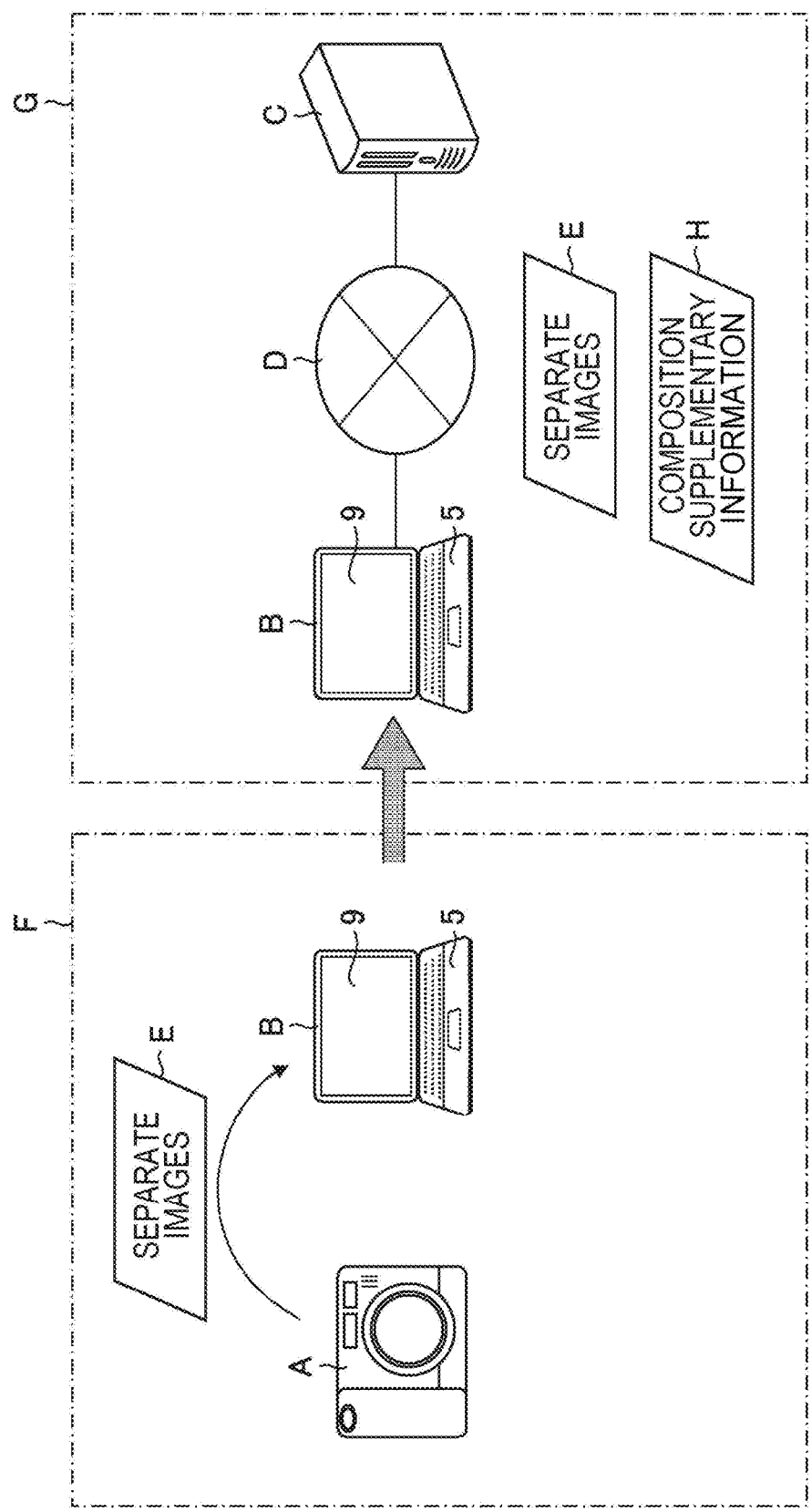
FIG. 1 is a diagram schematically illustrating an image capturing apparatus, a user terminal, and a damage detection server that constitute a composition processing system.

FIG. 1 is a diagram schematically illustrating an image capturing apparatus A, a user terminal B (first computer), and a damage detection server C (second computer) that constitute the composition processing system of the present invention.

The image capturing apparatus A and the user terminal B are located in an environment (local environment F) in which connection to a network, such as the Internet, is not possible. The local environment F is, for example, an outdoor environment, such as the inside of a tunnel or a mountainous area beyond the reach of radio waves. In a case where a structure that is an inspection target is, for example, the inside wall of a tunnel or a bridge in a mountainous area, the image capturing apparatus A acquires separate images E of the structure that is an inspection target in the local environment F. After the separate images E of the structure have been acquired, the separate images E are sent to the user terminal B. In this case, the image capturing apparatus A and the user terminal B are present in the local environment F, and the separate images E are transmitted and received through local communication. When receiving the separate images E, the user terminal B composes and displays on a monitor 9 a simple large-area image (second large-area image) on the basis of the received separate images E. The user (inspector) can check the simple large-area image displayed on the monitor 9 to check the presence or absence of a region omitted from image capturing or a low-image-quality region at the image-capturing site (local environment F).

Accordingly, the simple large-area image is displayed on the monitor 9 by the user terminal B, and therefore, the user can check the presence or absence of a region omitted from image capturing and a low-image-quality region, in the local environment F. Here, a large-area image (first large-area image, which is not a simple large-area image but a large-area image that is not reduced in image size) acquired by compositing the separate images E is large in data volume and requires a computer having a very high computational capacity when processed. Composition of a large-area image at an image-capturing site by using an easily movable small computer (user terminal B) that is, for example, taken by the user to the image-capturing site might not be possible or may be possible but take too long when taking into consideration the computational capacity of the user terminal B, and therefore, is not practical. To the user terminal B, the monitor 9 is connected, and the user inputs a command using a keyboard 5. Note that the form of the illustrated computer is an example. For example, instead of the illustrated computer, a tablet terminal can be used.

After confirming that the separate images E do not include a region omitted from image capturing or a low-image-quality region, the user terminates image capturing of the separate images E and moves the user terminal B to an environment (Internet environment G) in which connection to the Internet D is possible (communication is possible). The user terminal B moved to the Internet environment G establishes a connection with the Internet D and transmits the separate images E and composition supplementary information H to the damage detection server C. Note that the user terminal B may automatically transmit to the damage detection server C the plurality of separate images to which the composition supplementary information H is added in a case where the condition of connection to the Internet D becomes good. When receiving the separate images E and the composition supplementary information H, the damage detection server C uses the separate images E and the composition supplementary information H to compose a large-area image. The damage detection server C detects damage, such as cracks, from the large-area image and transmits the result of damage detection to the user terminal B together with the large-area image. Note that the damage detection server C may transmit the large-area image and the result of damage detection to another terminal different from the user terminal B. Here, the other terminal is a terminal that is different from the user terminal B, which has transmitted the separate images E and the composition supplementary information H to the damage detection server C, and that can display the large-area image and the result of damage detection. The damage detection server C is formed of a large computer and has a computational capacity sufficient for composition of large-area images. The damage detection server C has functions of a server, can transmit and receive data to and from the user terminal B via the Internet D, and functions as a cloud server.

Figure 2:
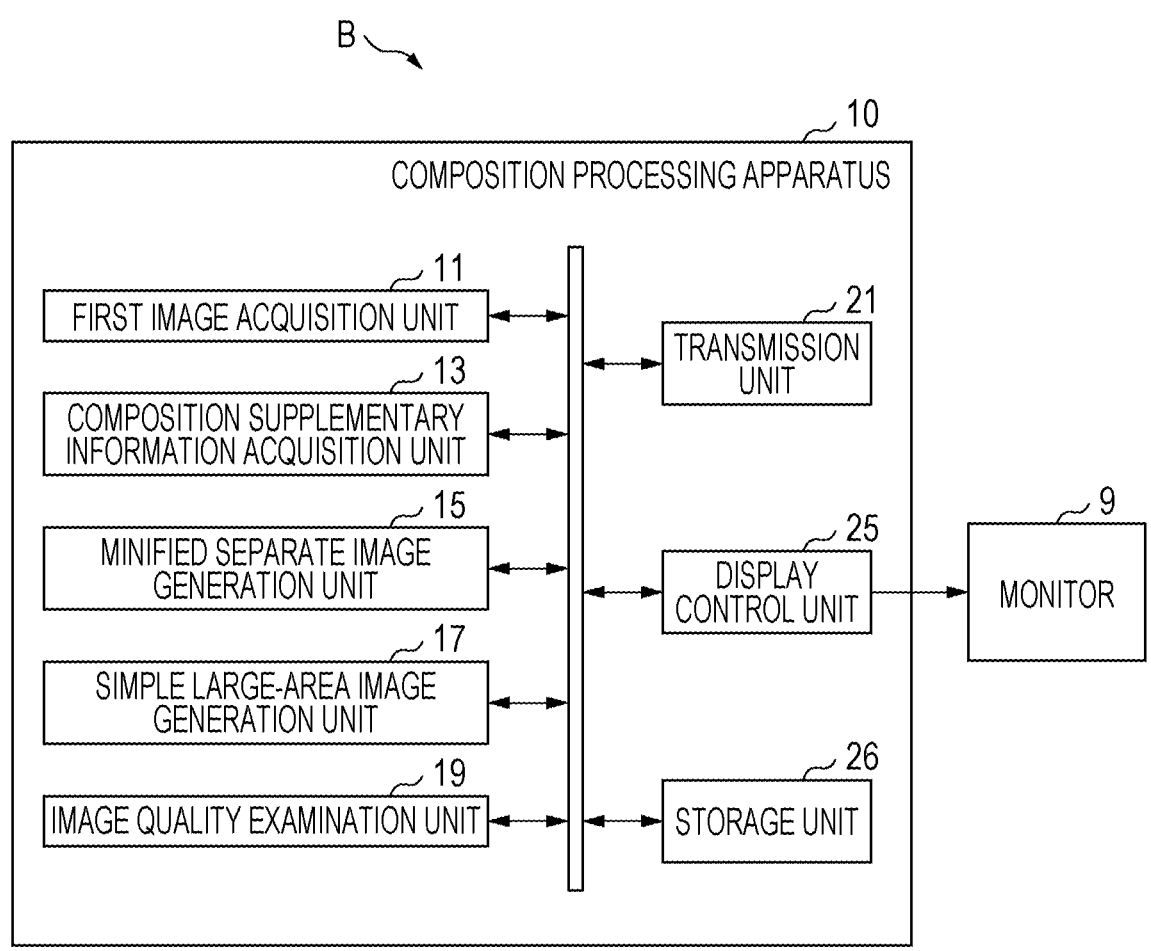
FIG. 2 is a block diagram illustrating an example functional configuration of a composition processing apparatus mounted in the user terminal.

FIG. 2 is a block diagram illustrating an example functional configuration of a composition processing apparatus 10 mounted in the user terminal B. The hardware configuration of the composition processing apparatus 10 for performing various types of control is implemented as various processors as described below. The various processors include a CPU (central processing unit), which is a general-purpose processor executing software (program) to function as various control units, a programmable logic device (PLD), such as an FPGA (field-programmable gate array), which is a processor having a circuit configuration that is changeable after manufacture, and a dedicated electric circuit, such as an ASIC (application-specific integrated circuit), which is a processor having a circuit configuration specifically designed to perform specific processing.

One processing unit may be configured as one of the various processors or two or more processors of the same type or different types (for example, a plurality of FPGAs or a combination of a CPU and an FPGA). Further, a plurality of control units may be configured as one processor. As the first example of configuring a plurality of control units as one processor, a form is possible where one processor is configured as a combination of one or more CPUs and software, and the processor functions as the plurality of control units, a representative example of which is a computer, such as a client or a server. As the second example thereof, a form is possible where a processor is used in which the functions of the entire system including the plurality of control units are implemented as one IC (integrated circuit) chip, a representative example of which is a system on chip (SoC). As described above, regarding the hardware configuration, the various control units are configured by using one or more of the various processors described above.

The composition processing apparatus 10 includes a first image acquisition unit 11, a composition supplementary information acquisition unit 13, a minified separate image generation unit 15, a simple large-area image generation unit (second large-area image generation unit) 17, an image quality examination unit 19, a transmission unit 21, a display control unit 25, a storage unit 26, and the monitor 9. In the storage unit 26, programs and information, etc. related to various types of control of the composition processing apparatus 10 are stored. The display control unit 25 controls display by the monitor 9. The display control unit 25 and the monitor 9 constitute an image display unit.

The first image acquisition unit 11 acquires a plurality of separate images E acquired by the image capturing apparatus A performing image capturing of a structure that is an inspection target in sections. For damage detection, it is necessary to capture images of a structure at a certain resolution with which damage to the structure can be detected by image processing. Therefore, the first image acquisition unit 11 acquires the separate images E of a structure at a certain resolution with which damage detection is possible, and thereafter, the separate images E are composited to generate a large-area image, and damage is detected. Damage may be detected from the acquired separate images E, and thereafter, a large-area image may be composed. Note that the first image acquisition unit 11 acquires separate images from the image capturing apparatus A wirelessly or by wire.

The composition supplementary information acquisition unit 13 acquires on the basis of the separate images E the composition supplementary information H for composing a large-area image (first large-area image) that corresponds to the inspection area of the structure. The composition supplementary information acquisition unit 13 acquires the composition supplementary information H of not minified separate images but the separate images E.

The minified separate image generation unit 15 generates minified separate images acquired by reducing the image sizes of the separate images. The minified separate images are images that constitute a simple large-area image (second large-area image), and the simple large-area image is generated by compositing the minified separate images. Here, reducing an image size means, for example, a process for decreasing the number of pixels that constitute the image.

The simple large-area image generation unit (second large-area image generation unit) 17 composites the minified separate images on the basis of the composition supplementary information H to generate a simple large-area image. The simple large-area image is composed of the minified separate images, and therefore, a computational capacity required to perform the composition processing is reduced. Accordingly, the simple large-area image can be generated in a short time by the user terminal B having a computational capacity that is not so high. The user can check the simple large-area image displayed on a display unit to thereby check the presence of a region omitted from image capturing or a low-image-quality region.

The image quality examination unit 19 examines the image quality of the separate images. The image quality examination unit 19 examines the image quality of the separate images E acquired by the first image acquisition unit 11 and gives a user a notification that a separate image E having low image quality is present, if any, to encourage the user to re-perform image capturing. Specific methods for image quality examination by the image quality examination unit 19 will be described in detail below.

The transmission unit 21 transmits the separate images E and the composition supplementary information H to the damage detection server C. The transmission unit 21 may transmit the separate images E and the composition supplementary information H to the damage detection server C in accordance with a command from the user or may determine whether connection to the Internet D is possible and automatically transmit the separate images E and the composition supplementary information H to the damage detection server C in a case where the transmission unit 21 determines that connection is possible.

Figure 3:
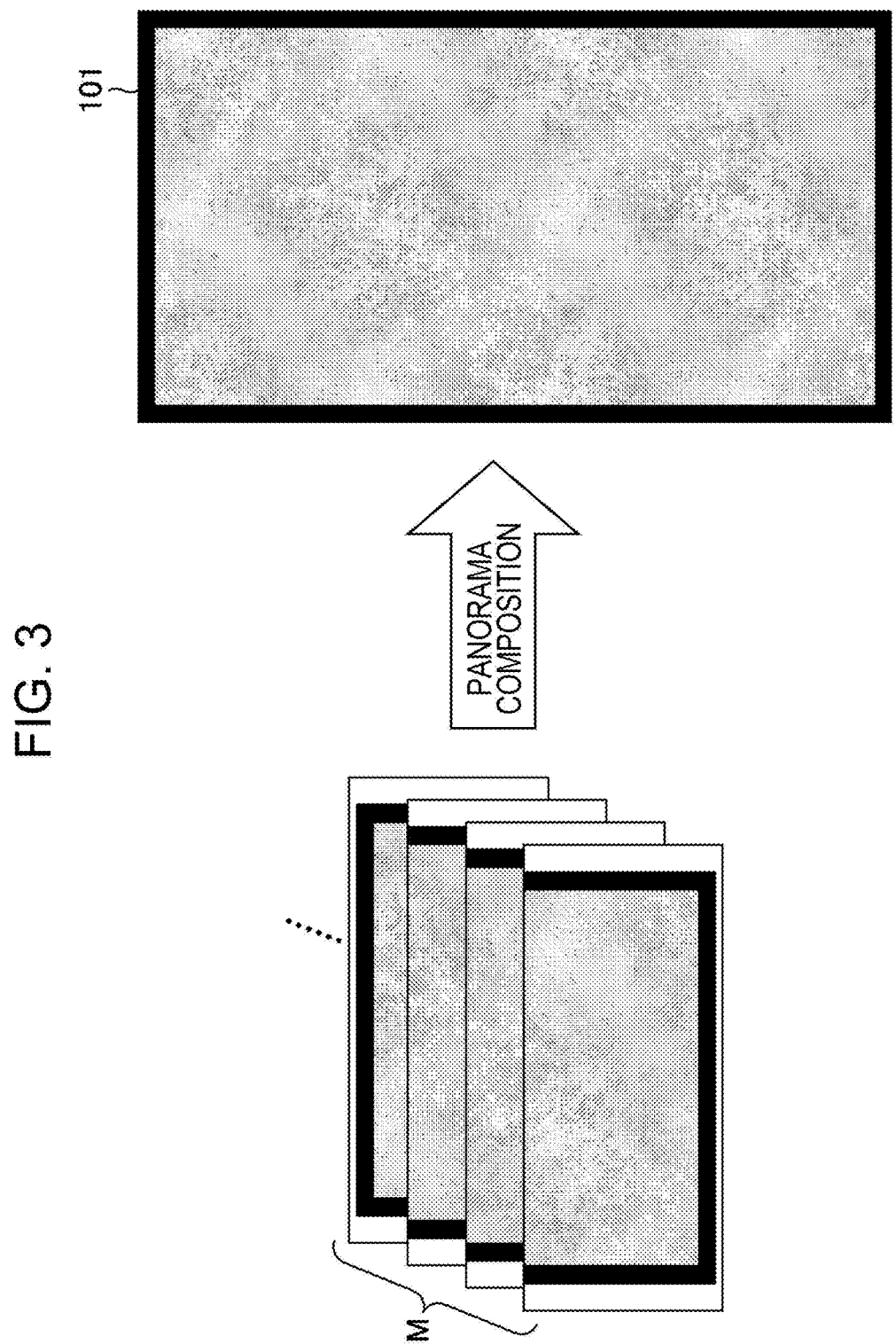
FIG. 3 is a diagram for explaining an operation, performed by the composition processing apparatus, of compositing minified separate images to acquire a simple large-area image.

FIG. 3 is a diagram for explaining an operation, performed by the composition processing apparatus 10, of compositing minified separate images M to acquire a simple large-area image 101.

The composition processing apparatus 10 generates the minified separate images M on the basis of the separate images E and performs panorama composition for the minified separate images M to generate the simple large-area image 101.

Specifically, the composition supplementary information acquisition unit 13 extracts feature points of the separate images E and performs matching of the feature points in the separate images E (extracts correspondence points). Here, the composition supplementary information acquisition unit 13 extracts feature points and performs matching of the feature points by using a publicly known technique. The composition supplementary information acquisition unit 13 calculates a projective transformation matrix of each separate image E relative to a reference image selected from among the separate images E. The projective transformation matrices thus calculated correspond to an example of the composition supplementary information H acquired by the composition supplementary information acquisition unit 13.

The minified separate image generation unit 15 generates the minified separate images M from the separate images E. The simple large-area image generation unit 17 performs panorama composition for the minified separate images M to generate the simple large-area image 101. For example, the minified separate image generation unit 15 reduces the image sizes of the separate images E to generate the minified separate images M such that the image size of the simple large-area image is less than or equal to a predetermined maximum value (for example, the image has 3000 pixels on its long side). In a case where a large-area image is composed of the separate images E without reducing their image sizes, the large-area image has, for example, 30000 pixels on its long side. However, in a case where the simple large-area image 101 is composed of the minified separate images M, the image size is such that the image has 3000 pixels on its long side, and composition can be performed with the image size reduced by one-hundredth. Accordingly, a computational load for composing the simple large-area image 101 can be reduced, and the user terminal B, which is a small computer having a computational capacity that is not so high, can satisfactorily perform composition. At the image-capturing site, a region omitted from image capturing can be satisfactorily checked with a simple large-area image having a reduced image size. For a simple large-area image, it is preferable to omit a process for fitting together the boundaries of the overlapping regions of the minified separate images. As long as a region omitted from image capturing can be checked, the process for fitting the boundaries is not specifically necessary.

Figure 4:
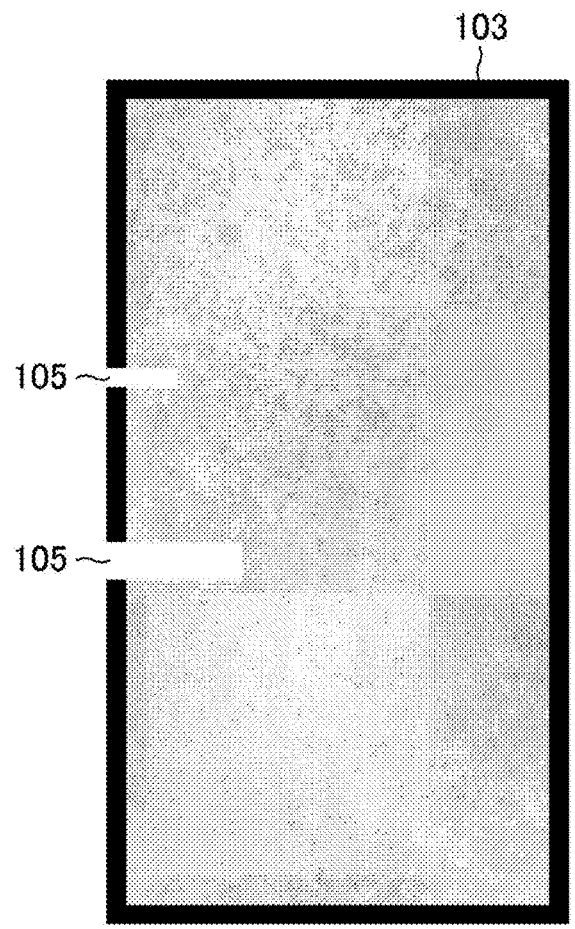
FIG. 4 is a diagram illustrating a simple large-area image.

FIG. 4 is a diagram illustrating a simple large-area image 103 displayed on the monitor 9 of the user terminal B.

The simple large-area image 103 is the simple large-area image 103 acquired by performing panorama composition for the minified separate images M. In the simple large-area image 103, regions omitted from image capturing 105 are present. The user can check the simple large-area image 103 displayed on the monitor 9 to thereby check the regions omitted from image capturing 105 and can immediately capture separate images corresponding to the regions omitted from image capturing 105 at the image-capturing site. Accordingly, even in a situation where connection to the damage detection server C is not possible as in the local environment F, the user can grasp regions omitted from image capturing and additionally acquire separate images E.

Now, image quality examination of separate images performed by the image quality examination unit 19 is described.

The image quality examination unit 19 examines the image quality of an inspection image acquired by the first image acquisition unit 11. Here, the image quality examination unit 19 can perform examination by using various methods. Specific examples of the examination method used by the image quality examination unit 19 are described below.

First, examination of image quality using machine learning is described. A first image quality examination method used by the image quality examination unit 19 is an examination method using an image quality examination tool that is subjected to machine learning. Specifically, the image quality examination unit 19 is formed of an image quality examination tool subjected to machine learning (image quality examination AI (artificial intelligence)) and examines the image quality of an inspection image by using the image quality examination tool.

Next, image quality examination using a spatial frequency spectrum is described. The image quality examination unit 19 examines the image quality of an inspection image while quantifying the image quality on the basis of, for example, the maximum or average spectrum or the sum of the spectra of a high-frequency range in the spatial frequency spectrum of a region in the inspection image. Specifically, as the maximum value, the average value, or the sum of the components within a radius of a specific number of pixels (r-pixel radius) from the four corners of a spatial frequency spectral image (acquired by performing a fast Fourier transform (FFT) for a captured image) increases, the high-frequency components are stronger (the number of high-frequency components is larger), and therefore, blurring occurs to a smaller degree and the image quality is better.

Figure 5:
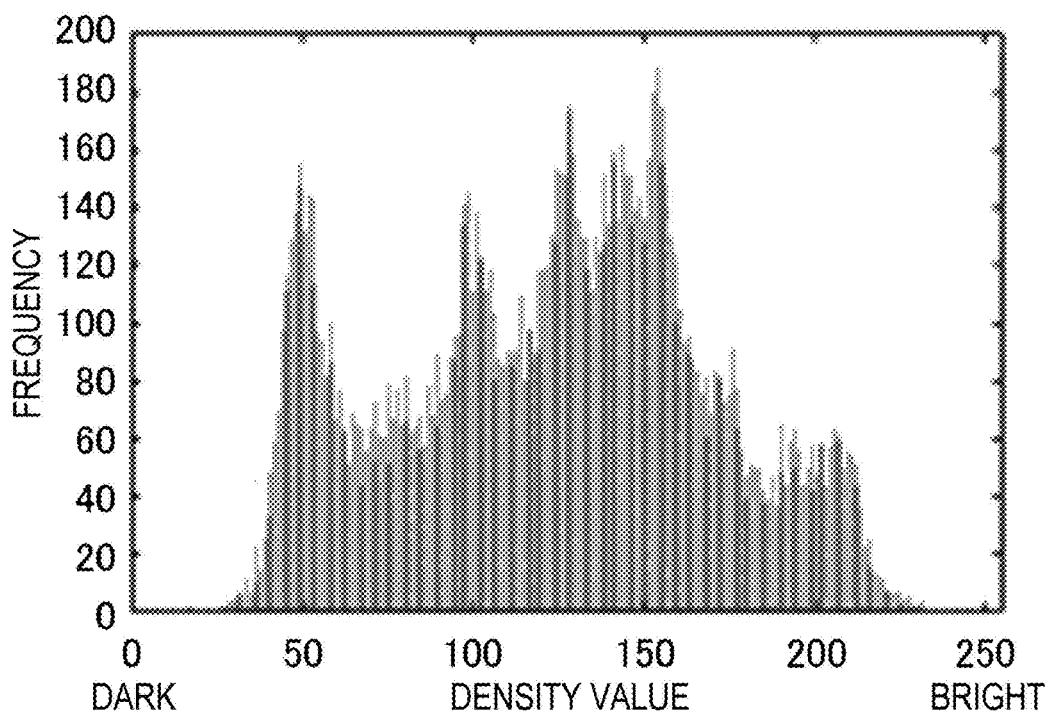
FIG. 5 is a diagram illustrating an example density histogram.

Next, image quality examination using a histogram is described. The image quality examination unit 19 performs determination using a histogram (an example indicator indicating image quality) in which the image quality examination unit 19 converts an individual image (a color image formed of R, G, and B components) to a gray-scale image as expressed by, for example, gray scale (density)=R×0.30+G×0.59+B×0.11 (R, G, and B are the values of red, green, and blue signals respectively). The image quality examination unit 19 calculates a histogram (density histogram, see the example in FIG. 5) of the gray-scale image acquired as a result of conversion. Calculation of the histogram and determination described below may be performed not for the entire individual image but for a partial region of the individual image. The image quality examination unit 19 assumes G(i) {i=0, 1, . . . , 255} to be a histogram of each density value (darkness increases as the value is closer to 0, and brightness increases as the value is closer to 255) and examines whether an individual image is too bright or too dark by using expressions (1) and (2) below. The threshold values (kb, hb, kd, and hd) for examination may be default values (for example, kb=205, hb=0.5, kd=50, and hd=0.5) or may be set by the image quality examination unit 19 in accordance with input by the user via an operation unit, such as the keyboard 5.

$$\frac{\sum_{j=kb}^{255} G(j)}{\sum_{i=0}^{255} G(i)} \geq hb \quad (1)$$

$$\frac{\sum_{j=0}^{kd} G(j)}{\sum_{i=0}^{255} G(i)} \geq hb \quad (2)$$

The image quality examination unit 19 determines that the individual image is "too bright" in a case where the proportion of density values greater than or equal to kb to the total density value is hb or more in expression (1) above. In this case, the image quality examination unit 19 determines that the individual image is "(too bright), and therefore, has low image quality" and regards the individual image as a check target image. Similarly, the image quality examination unit 19 determines that the individual image is "(too dark), and therefore, has low image quality" in a case where the proportion of density values less than or equal to kd to the total density value is hd or more in expression (2) above and regards the individual image as a check target image.

On the basis of the histogram, it is also possible to examine whether gradations are lost. For example, the image quality examination unit 19 assumes G(i) {i=0, 1, . . . , 255} to be a histogram of each density value and determines that "gradations on the shadow side are lost" in a case of G(0)>Td and that "gradations on the highlight side are lost" in a case of G(255)>Tb. In these cases, the image quality examination unit 19 determines that "the image quality is low" and regards the individual image as a check target image. The threshold values (Td and Tb) for examination may be default values (for example, Td=0 and Tb=0) or may be set by the image quality examination unit 19 in accordance with input by the user via an operation unit (the keyboard 5).

As described above, the image quality examination unit 19 examines the image quality of the separate images E by using various methods.

Figure 6:
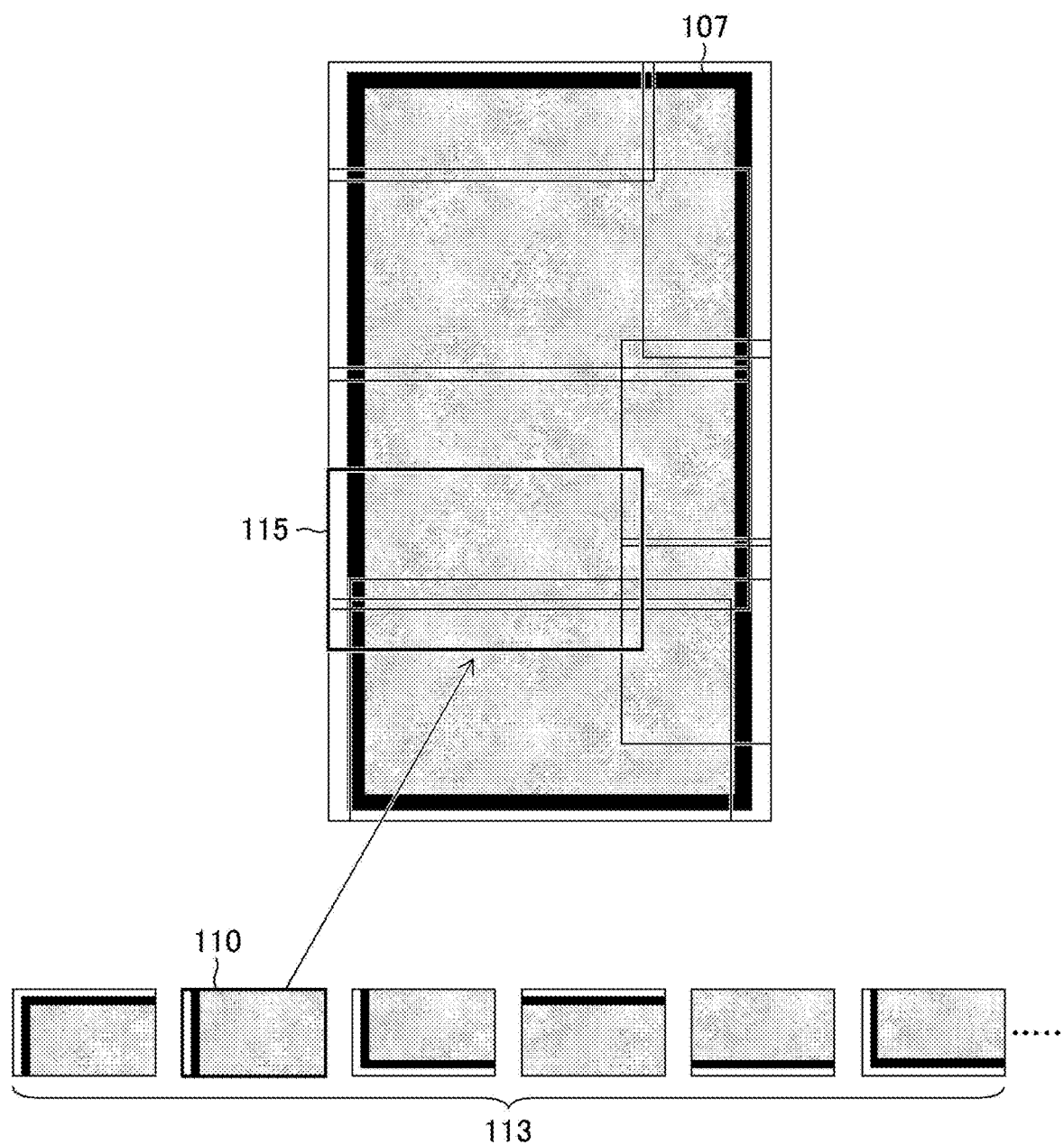
FIG. 6 is a diagram illustrating an example where an examination result is superimposed on a simple large-area image and displayed.
Figure 7:
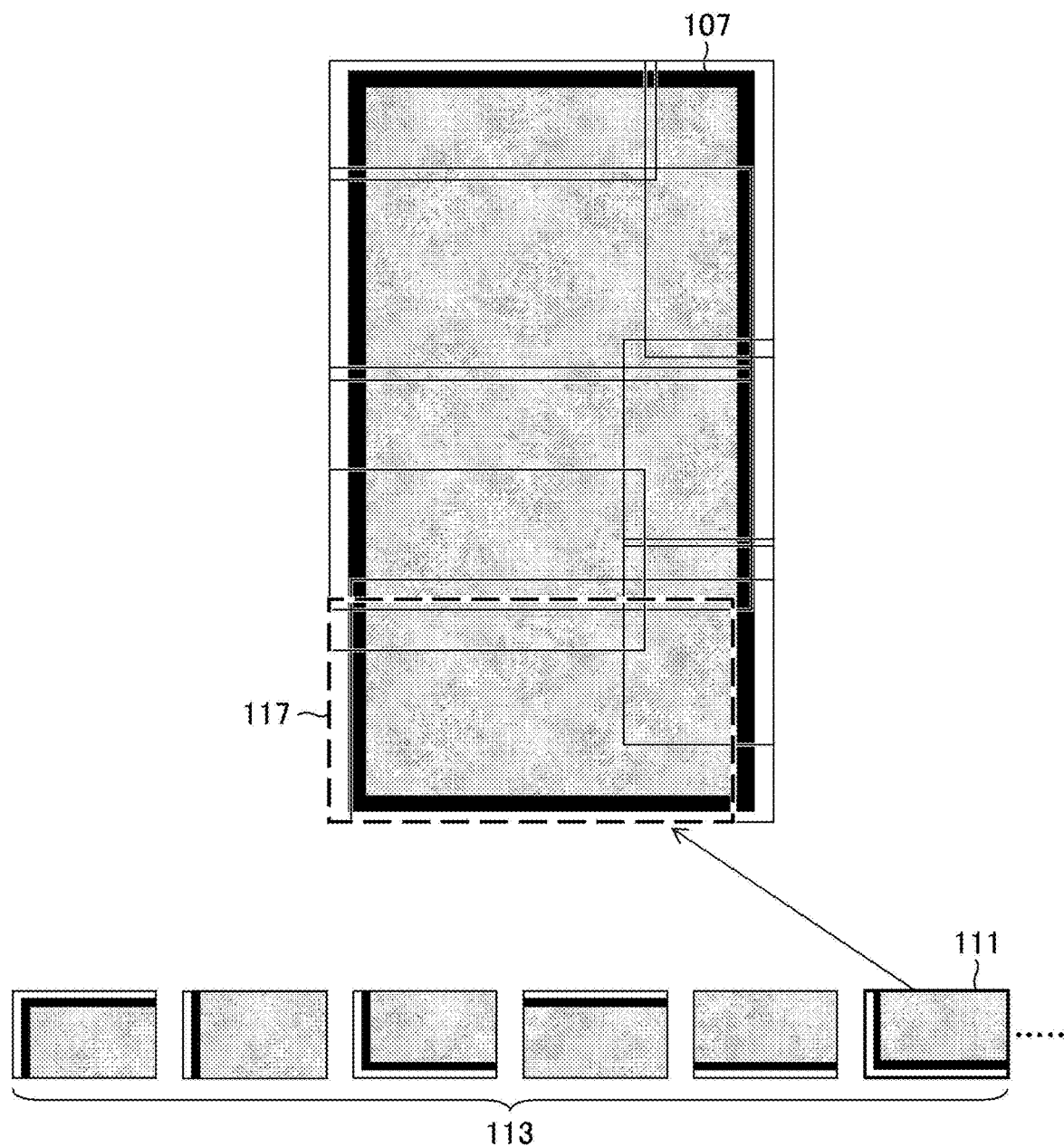
FIG. 7 is a diagram illustrating an example where an examination result is superimposed on a simple large-area image and displayed.

FIG. 6 and FIG. 7 are diagrams illustrating examples where the result of examination by the image quality examination unit 19 is superimposed on a simple large-area image and displayed.

In the display form on the monitor 9 illustrated in FIG. 6 and FIG. 7, thumbnail display 113 of the separate images E is displayed together with a simple large-area image 107. When a separate image E in the thumbnail display 113 is selected, the selected separate image E in the simple large-area image 107 is highlighted. Simultaneously with the highlight display, the result of examination by the image quality examination unit 19 is also displayed.

In FIG. 6, a separate image 110 selected from the thumbnail display 113 corresponds to a region 115 in the simple large-area image 107, and therefore, the region 115 is highlighted. The separate image 110 is determined to have high image quality as a result of image quality examination by the image quality examination unit 19, and therefore, highlight display indicating high image quality is performed on the region 115. Meanwhile, in FIG. 7, a separate image 111 selected from the thumbnail display 113 corresponds to a region 117 in the simple large-area image 107, and therefore, the region 117 is highlighted. The separate image 111 is determined to have low image quality as a result of image quality examination by the image quality examination unit 19, and therefore, highlight display indicating low image quality is performed on the region 117. With reference to FIG. 6 and FIG. 7, an example where a region of the simple large-area image corresponding to the separate image 110 selected from the thumbnail display 113 is highlighted has been described; however, highlight display is not limited to this. For example, even in a case where selection from the thumbnail display 113 is not made, a region (a region in the large-area image) corresponding to a separate image that is determined to have low image quality as a result of image quality examination by the image quality examination unit 19 may be highlighted to give the user a notification.

As described above, the result of examination by the image quality examination unit 19 can be superimposed on the simple large-area image 107 and displayed to thereby give the user a notification of the image quality of the separate image, and the user can re-perform image capturing at the image-capturing site for the separate image having low image quality.

Now, the damage detection server C is described.

Figure 8:
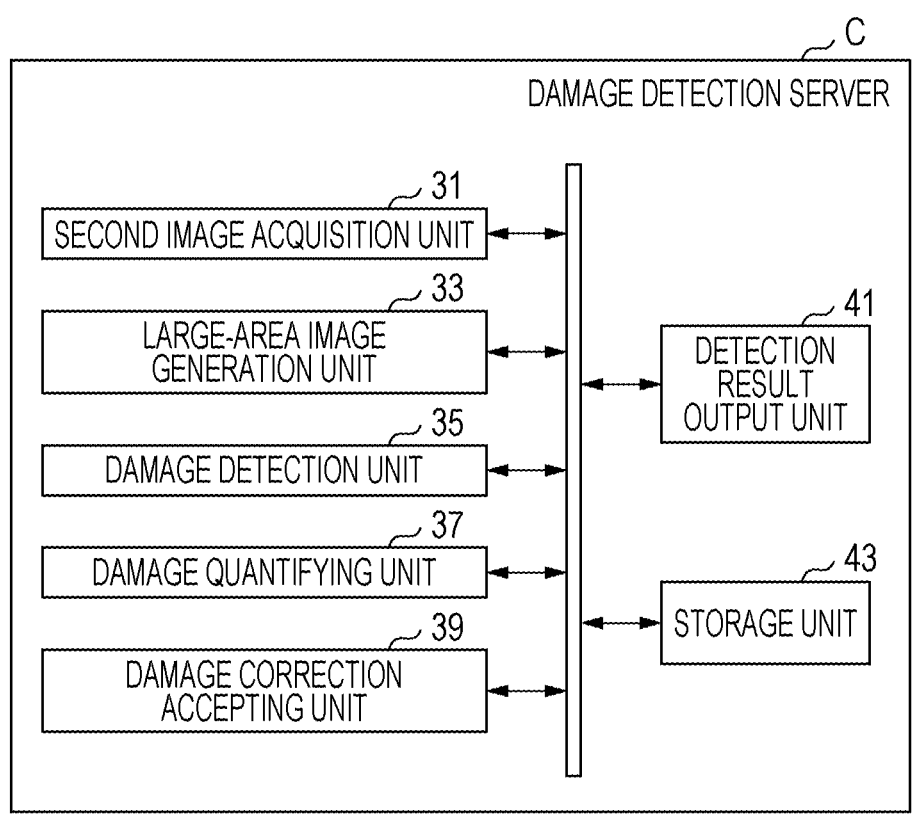
FIG. 8 is a block diagram illustrating an example functional configuration of the damage detection server.

FIG. 8 is a block diagram illustrating an example functional configuration of the damage detection server C. Note that the functions of the damage detection server C can also be implemented as a processor, such as a CPU, as in the composition processing apparatus 10 described above.

The damage detection server C includes a second image acquisition unit 31, a large-area image generation unit (first large-area image generation unit) 33, a damage detection unit 35, a damage quantifying unit 37, a damage correction accepting unit 39, a detection result output unit 41, and a storage unit 43.

In the storage unit 43, programs and information, etc. related to various types of control of the damage detection server C are stored.

The second image acquisition unit 31 acquires from the user terminal B, separate images to which the composition supplementary information H is added. Specifically, in a situation where the user terminal B and the damage detection server C can be connected to each other over the Internet D, the second image acquisition unit 31 acquires the separate images E and the composition supplementary information H via the Internet D.

The large-area image generation unit 33 composites the separate images E on the basis of the composition supplementary information H to generate a large-area image. The large-area image generation unit 33 uses the composition supplementary information H acquired by the composition supplementary information acquisition unit 13 of the user terminal B to perform panorama composition for the separate images E and generate a large-area image. The damage detection server C is formed of a large computer and has a high computational capacity, and therefore, is capable of performing panorama composition for the separate images E to generate a large-area image. The large-area image generation unit 33 uses the composition supplementary information H acquired by the composition supplementary information acquisition unit 13 of the user terminal B to composite the separate images E, and therefore, need not newly acquire the composition supplementary information H and can efficiently compose a large-area image.

The damage detection unit 35 detects damage from a large-area image. The damage detection unit 35 can use a publicly known technique to detect various types of damage. Specific examples of damage detected by the damage detection unit 35 include corrosion, fractures, loosening or falling off, ruptures, degradation of an anticorrosive function, cracks, peeling or exposure of reinforcing rods, water leakage or free lime, coming off, damage to repair or reinforcing material, cracks in floor slabs, rising, abnormalities in joint gaps, irregularities on road surfaces, abnormalities in pavements, functional troubles in bearings, others (damage caused by fire and so on), abnormalities in fixings, discoloration or degradation, water leakage or stagnant water, abnormal sound or vibration, abnormal bending, deformation or chipping, plugging with dirt, sinking, movement, or sloping, and scours. A large-area image may be generated after the damage detection unit 35 has detected damage from the separate images E.

The damage quantifying unit 37 estimates the extent of damage detected by the damage detection unit 35 and quantitatively evaluates the extent of damage. The damage quantifying unit 37 uses a publicly known technique to estimate the extent of damage and quantitatively evaluate the extent of damage. Specifically, the damage quantifying unit 37 quantifies, for example, the area of corrosion, the depth of corrosion, the length of a fracture, the length of a crack, the width of a crack, the number of loosening locations, the number of locations where falling off (of nuts or bolts) has occurred, the space between cracks, the direction of a crack, the area of water leakage or free lime, and the area of peeling or exposure of reinforcing rods.

The damage correction accepting unit 39 accepts a correction to damage detected by the damage detection unit 35. For example, the damage correction accepting unit 39 accepts, for the result of damage detection displayed on the monitor 9 of the user terminal B, a correction input by the user via operation units (the keyboard 5 and a mouse (not illustrated)) of the user terminal B.

The detection result output unit 41 outputs the result of detection of damage detected by the damage detection unit 35. The detection result output unit 41 can output the result of detection in various forms. For example, the detection result output unit 41 may integrate and output quantitative evaluation acquired by the damage quantifying unit 37. Specifically, the detection result output unit 41 outputs the dimensions of detected damage as a CSV (comma-separated value) file. The detection result output unit 41 may superimpose on a CAD (computer-assisted drafting) drawing and output the result of detection or may superimpose on a large-area image and output the result of detection.

Figure 9:
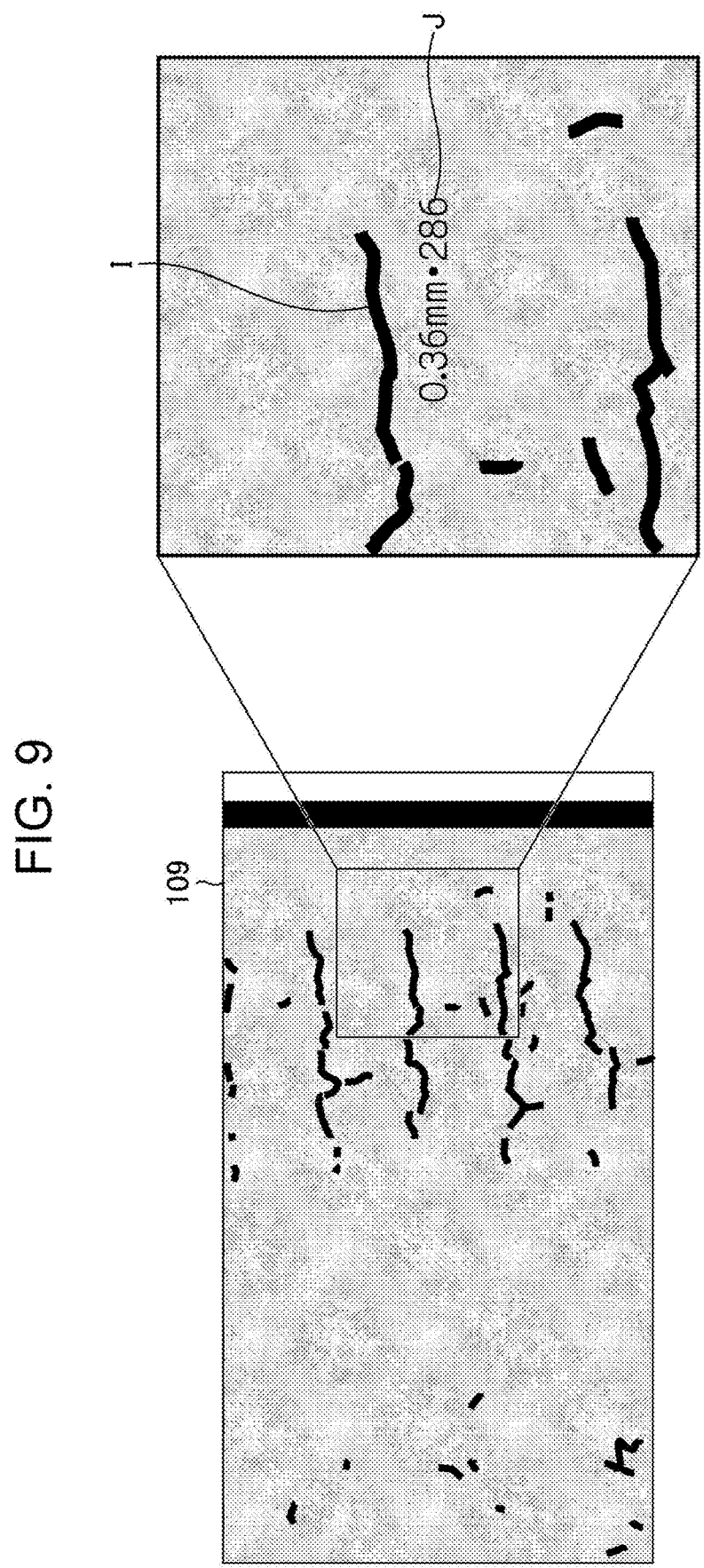
FIG. 9 is a diagram illustrating an example result of damage (crack) detection from a large-area image.

FIG. 9 is a diagram illustrating an example result of damage (crack) detection from a large-area image performed by the damage detection server C.

From a large-area image 109 displayed on the monitor 9 of the user terminal B, cracks are detected by the damage detection unit 35. The result of detection of a crack is indicated by a crack line I, and the crack line I is superimposed on the large-area image 109 and displayed. The width of the crack corresponding to the crack line I is estimated by the damage quantifying unit 37, and the estimated quantified evaluation (the width of the crack) is superimposed on the large-area image 109 and displayed as display J. Note that as the display J, the identification number of the crack is displayed in addition to the width of the crack. The user can check the display J to thereby acquire information about the width of the crack corresponding to the crack line I.

Figure 10:
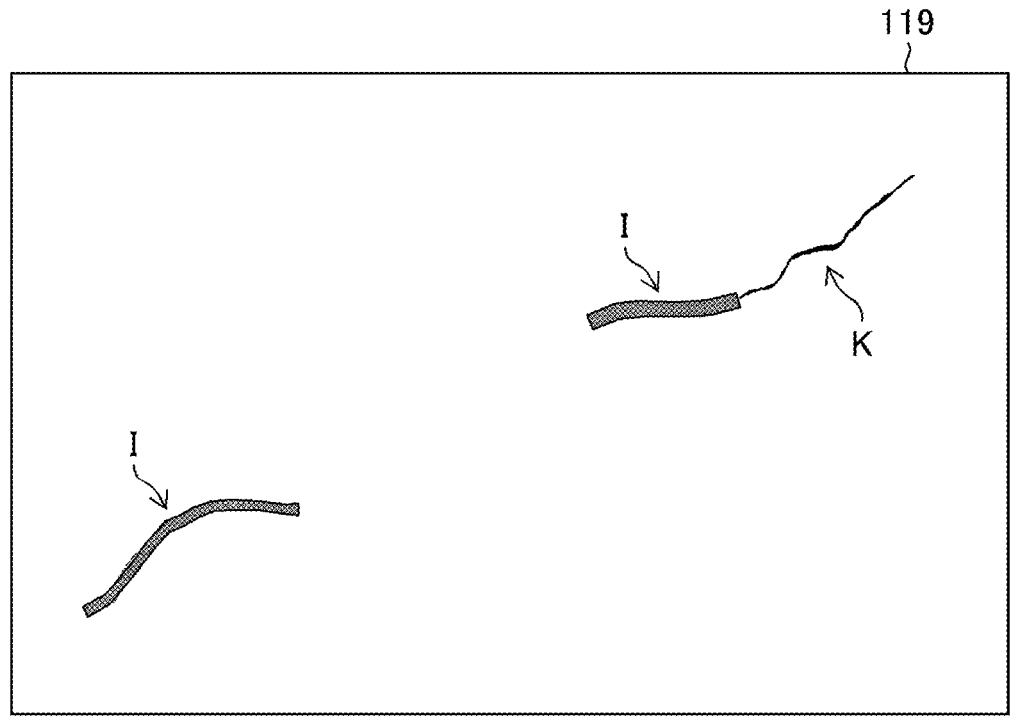
FIG. 10 is a diagram for explaining a correction to detected damage.
Figure 11:
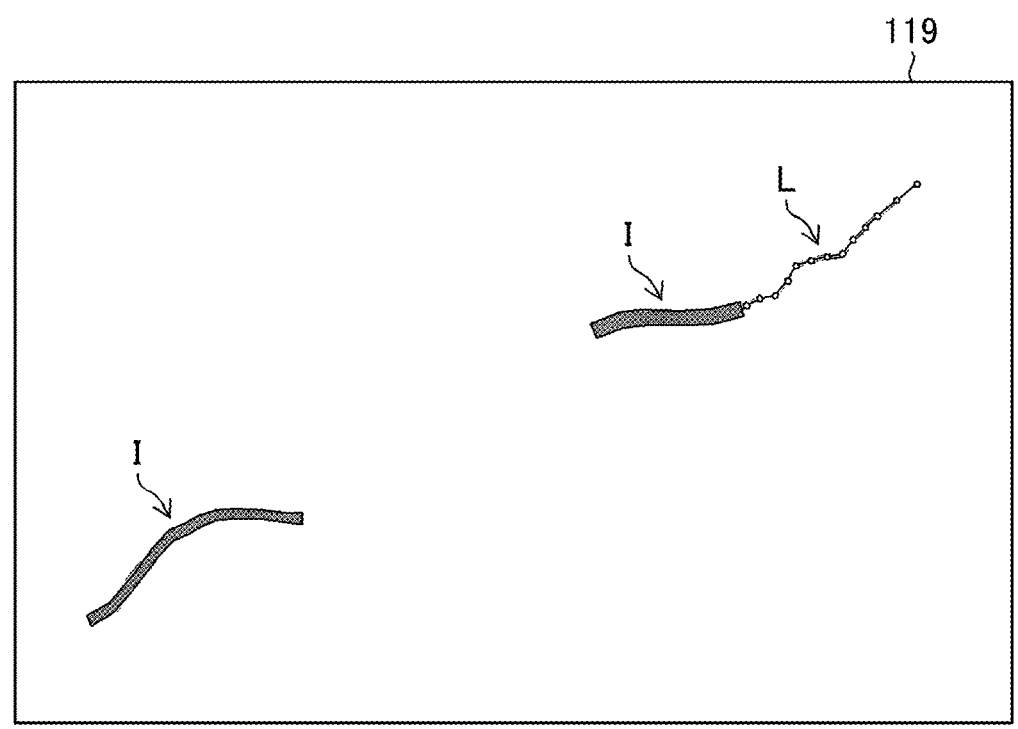
FIG. 11 is a diagram for explaining a correction to detected damage.

FIG. 10 and FIG. 11 are diagrams for explaining a correction to detected damage. FIG. 10 illustrates a large-area image 119 that is displayed on the monitor 9 of the user terminal B. On the large-area image 119, the result of damage detection performed by the damage detection unit 35 is indicated by the crack lines I. A crack K is present in the large-area image 119, but the damage detection unit 35 fails to successfully detect the crack K, and therefore, the crack line I that corresponds to the crack K is not present.

FIG. 11 is a diagram for explaining a case where the user makes a correction to the large-area image 119 displayed on the monitor 9 by using the user terminal B. As illustrated in FIG. 11, the user adds a trace line L to the crack K not detected by the damage detection unit 35 to correct the result of damage detection. This correction is made via, for example, operation units (the keyboard 5 and a mouse (not illustrated)) of the user terminal B, and the correction made as the trace line L is accepted by the damage correction accepting unit 39 of the damage detection server C. The damage detection unit 35 reflects the correction accepted by the damage correction accepting unit 39 to the result of damage detection. Note that check and correction performed on the monitor 9 of the user terminal B have been described with reference to FIG. 10 and FIG. 11; however, the check and correction are not limited to this. Another terminal may be used to check the result of damage detection and to correct the result of damage detection as described with reference to FIG. 10 and FIG. 11.

Accordingly, the user can make a correction to the result of detection by the damage detection unit 35, and therefore, can acquire a more accurate result of damage detection.

Figure 12:
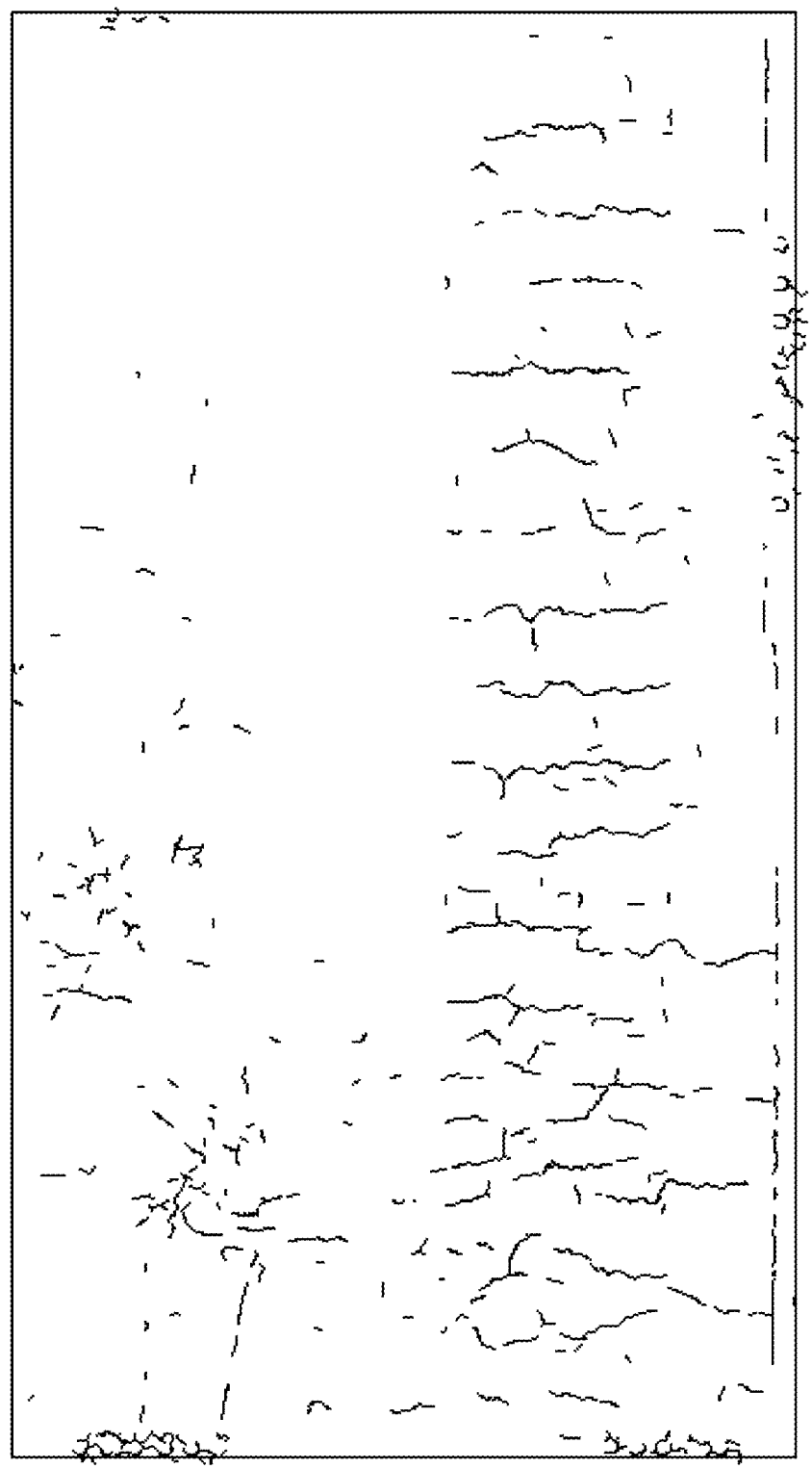
FIG. 12 is a diagram illustrating an example of output of the result of damage detection.
Figure 13:
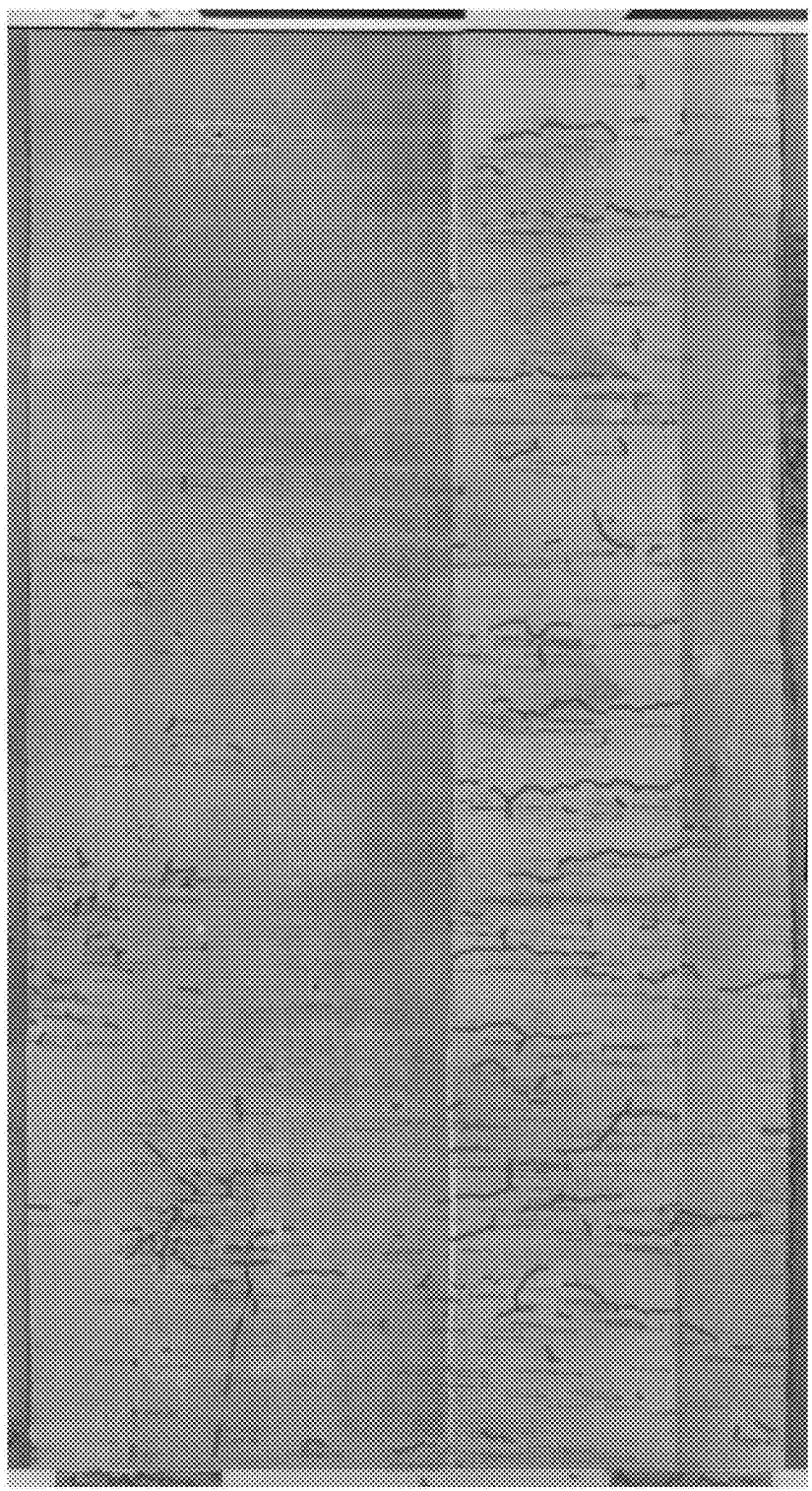
FIG. 13 is a diagram illustrating an example of output of the result of damage detection.

Now, examples of output by the detection result output unit 41 are described. The detection result output unit 41 can output the result of damage detection from a large-area image in various forms. FIG. 12 and FIG. 13 are diagrams illustrating examples of output of the result of damage detection output by the detection result output unit 41. FIG. 12 is a diagram illustrating an example where the result of damage detection is superimposed on a CAD drawing and displayed. FIG. 13 is a diagram illustrating an example where the result of damage detection is superimposed on a large-area image and displayed. Accordingly, damage detection is performed on the basis of a composed large-area image, and the result of detection is output in various forms.

Figure 14:
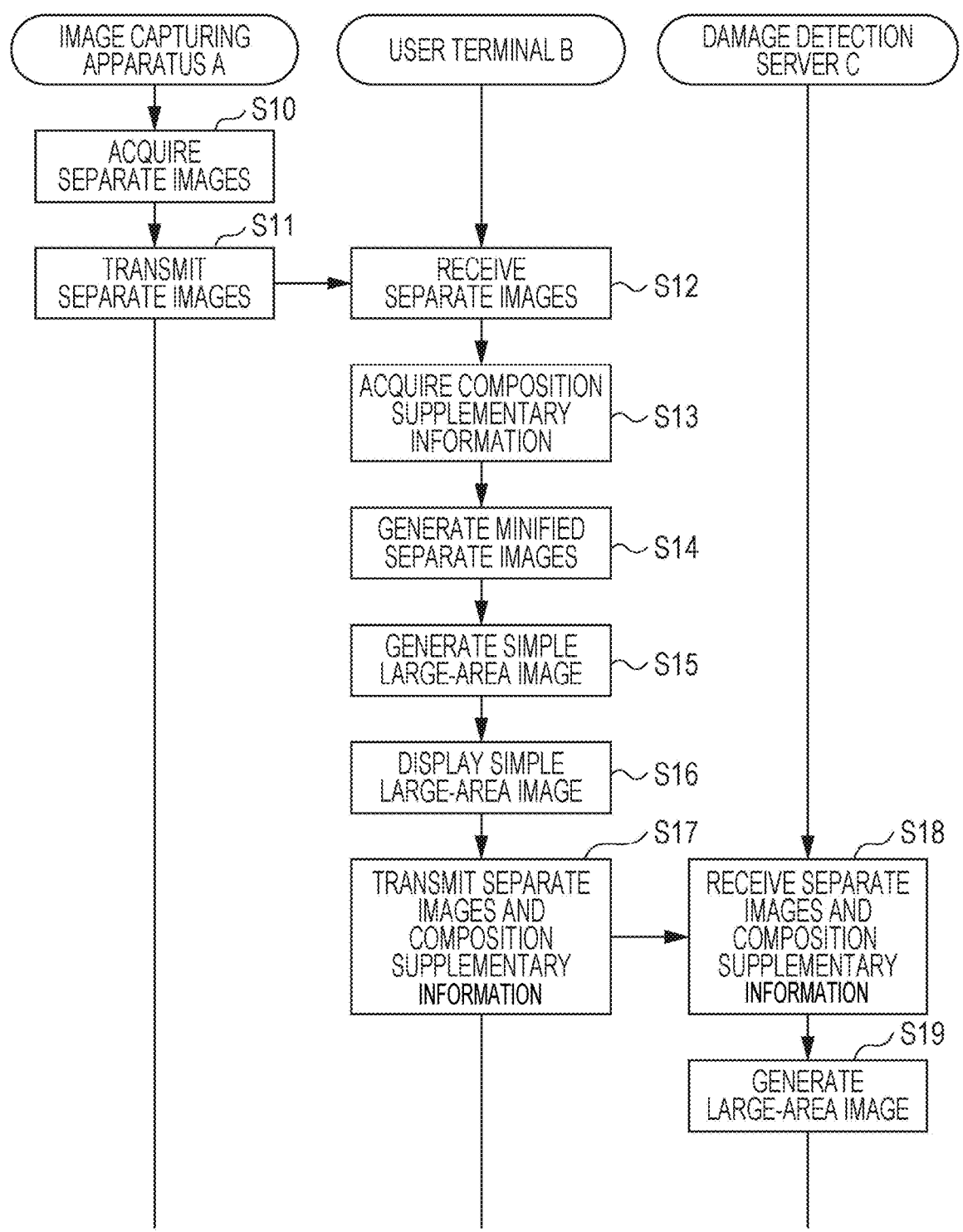
FIG. 14 is a flowchart illustrating steps of composition processing.

FIG. 14 is a flowchart illustrating steps of composition processing (the composition processing method) using the composition processing system.

First, the image capturing apparatus A acquires separate images of a structure that is an inspection target (step S10). Subsequently, the image capturing apparatus A transmits the separate images to the user terminal B (step S11). In this case, for example, the image-capturing site is the local environment F in which connection to the Internet D is not possible, and therefore, the image capturing apparatus A transmits the separate images to the user terminal B using transmission means usable in the local environment F.

The user terminal B receives the separate images via the first image acquisition unit 11 (step S12). Subsequently, the composition supplementary information acquisition unit 13 acquires the composition supplementary information H (step S13). For example, the composition supplementary information acquisition unit 13 acquires projective transformation matrices for performing panorama composition for the separate images. The minified separate image generation unit 15 generates minified separate images acquired by reducing the image sizes of the acquired separate images (step S14). Subsequently, the simple large-area image generation unit 17 generates a simple large-area image (step S15). The user terminal B displays the generated simple large-area image on the monitor 9 (step S16). The user checks the simple large-area image displayed on the monitor 9 to see whether a region omitted from image capturing or a low-image-quality region is present. In a case where a region omitted from image capturing or a low-image-quality region is present, the user re-captures a separate image corresponding to the region. In a case where a region omitted from image capturing or a low-image-quality region is not present, the user moves the user terminal B to the Internet environment G and connects the user terminal B to the Internet D to transmit the acquired separate images and the composition supplementary information H to the damage detection server C (step S17).

The damage detection server C receives via the second image acquisition unit 31 the separate images and the composition supplementary information H transmitted from the user terminal B via the Internet D (step S18). The damage detection server C generates a large-area image using the separate images and the composition supplementary information H (step S19).

The configurations and functions described above can be implemented as any hardware, software, or a combination thereof as appropriate. For example, the present invention is applicable to a program for causing a computer to perform the above-described processing steps (processing procedure), a computer-readable recording medium (non-transitory recording medium) to which the program is recorded, or a computer in which the program can be installed.

Although an example of the present invention has been described above, the present invention is not limited to the embodiment described above, and various modifications can be made without departing from the spirit of the present invention as a matter of course.

REFERENCE SIGNS LIST 5 keyboard
9 monitor
10 composition processing apparatus
11 first image acquisition unit
13 composition supplementary information acquisition unit
15 minified separate image generation unit
17 simple large-area image generation unit
19 image quality examination unit
21 transmission unit
25 display control unit
26 storage unit
31 second image acquisition unit
33 large-area image generation unit
35 damage detection unit
37 damage quantifying unit
39 damage correction accepting unit
41 detection result output unit
43 storage unit

What is claimed is:

1. A composition processing system comprising an image capturing apparatus, a first computer, and a second computer, wherein
the first computer comprises
at least one processor configured to:
acquire a plurality of separate images of a structure to be inspected, the plurality of images obtained by imaging the structure in a divided manner with the image capturing apparatus;
acquire on the basis of the plurality of separate images, composition supplementary information for composing a first large-area image that corresponds to a large inspection area of the structure;
generate minified separate images acquired by reducing image sizes of the separate images;
composite the minified separate images on the basis of the composition supplementary information to generate a second large-area image; and
displays the second large-area image on a display, and the second computer comprises
at least one processor configured to:
acquire from the first computer the plurality of separate images to which the composition supplementary information is added; and
composite the plurality of separate images on the basis of the composition supplementary information to generate the first large-area image.

2. The composition processing system according to claim 1, wherein the first computer further acquires a separate image captured by the image capturing apparatus after the second large-area image has been displayed on the display of the first computer.

3. The composition processing system according to claim 1, wherein the first computer examines image quality of the separate images.

4. The composition processing system according to claim 3, wherein the first computer superimposes a result of the examination, on the second large-area image on the display.

5. The composition processing system according to claim 1, wherein the first computer acquires a projective transformation matrix for performing panorama composition for the separate images.

6. The composition processing system according to claim 1, wherein the second computer outputs the generated first large-area image via a network.

7. The composition processing system according to claim 1, wherein the second computer is a cloud server.

8. The composition processing system according to claim 1, wherein
the first computer and the second computer are capable of communicating with each other over a network, and
the first computer transmits to the second computer the plurality of separate images to which the composition supplementary information is added in a case where a condition of connection to the network is good.

9. The composition processing system according to claim 1, wherein the second computer detects damage from the first large-area image.

10. The composition processing system according to claim 9, wherein the second computer estimates an extent of the detected damage and quantitatively evaluates the extent of the detected damage.

11. The composition processing system according to claim 9, wherein the second computer accepts a correction to the detected damage.

12. The composition processing system according to claim 9, wherein the second computer outputs a result of detection of the damage.

13. A composition processing apparatus comprising
at least one processor configured to:
acquire a plurality of separate images of a structure to be inspected, the plurality of images obtained by imaging the structure in a divided manner with the image capturing apparatus;
acquire on the basis of the plurality of separate images, composition supplementary information for composing a first large-area image that corresponds to a large inspection area of the structure;
generate minified separate images acquired by reducing image sizes of the separate images;
composite the minified separate images on the basis of the composition supplementary information to generate a second large-area image;
display the second large-area image on a display; and
output the plurality of separate images to which the composition supplementary information is added.

14. A composition processing method to be performed by an image capturing apparatus, a first computer, and a second computer, comprising:
acquiring, by the first computer, a plurality of separate images of a structure to be inspected, the plurality of images obtained by imaging the structure in a divided manner with the image capturing apparatus;
acquiring, by the first computer, on the basis of the plurality of separate images, composition supplementary information for composing a first large-area image that corresponds to a large inspection area of the structure;
generating, by the first computer, minified separate images acquired by reducing image sizes of the separate images;
compositing, by the first computer, the minified separate images on the basis of the composition supplementary information to generate a second large-area image;
displaying, by the first computer, the second large-area image on a display;
acquiring, by the second computer, from the first computer the plurality of separate images to which the composition supplementary information is added; and
compositing, by the second computer, the plurality of separate images on the basis of the composition supplementary information to generate the first large-area image
are performed.

* * * * *